June 5, 1928.
G. E. GUSTAFSON
MACHINE TOOL ORGANIZATION
Filed Feb. 23, 1926
1,671,989
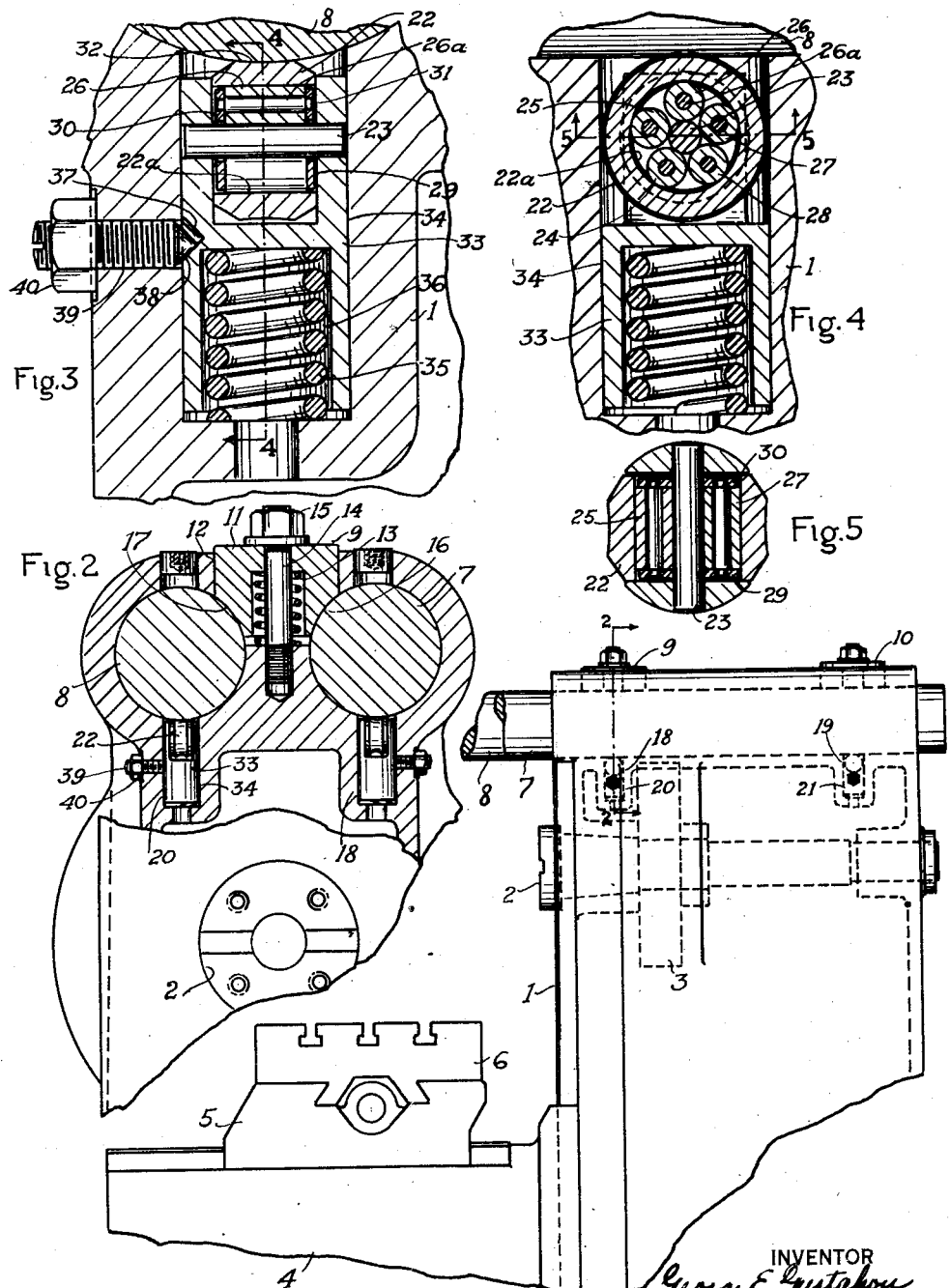
INVENTOR
George E. Gustafson
BY
Fred C. Parsons
ATTORNEY Patented June 5, 1928.

1,671,989

UNITED STATES PATENT OFFICE.

GEORGE E. GUSTAFSON, OF FITCHBURG, MASSACHUSETTS, ASSIGNOR TO KEARNEY & TRECKER CORPORATION, OF WEST ALLIS, WISCONSIN.

MACHINE-TOOL ORGANIZATION.

Application filed February 23, 1926. Serial No. 90,115.

The main object of this invention is an improvement in the organization of machine tools and to provide means whereby slidable overarms of machine tools may more readily be manually shifted for various purposes well known in the art.

The invention consists in certain novel features of construction, arrangement and combination of parts as hereinafter particularly described and claimed.

In the accompanying drawings the same parts are designated by corresponding numbers in each of the several views.

Fig. 1 is an elevation viewed from the right, of the upper portion of a machine tool of the general type commonly known as a knee and column type milling machine which incorporates my invention but from which certain well known parts have been omitted as unnecessary to illustrate my invention.

Fig. 2 is a front elevation of the upper portion of the same machine partially in section along line 2—2 of Fig. 1 and enlarged.

Fig. 3 is an enlarged vertical partial section of a portion of the left hand mechanism shown in Fig. 2.

Fig. 4 is a vertical section along line 4—4 of Fig. 3.

Fig. 5 is a section along line 5—5 of certain of the mechanism shown in Fig. 4.

A stationary support or column 1 rotatably supports a tool spindle 2 upon which is fixed a driving gear 3 connectible to be driven from a power source and by a train of gearing not shown. The column likewise supports a vertically slidable knee 4, a transversely slidable saddle 5 and a longitudinally slidable work table 6; the column, knee, saddle and table constituting work supports together providing work movement relative to the tool spindle in three transverse paths.

Slidably supported from column 1 are overarms 7 and 8 which may be of any of several well known types but for which I have preferred to illustrate the type consisting of a round bar, and have preferred to use two such overarms instead of one for various reasons.

Each of the overarms 7 and 8 is slidable in a suitable bore in the column 1, either forward to project from the front of the machine when the conditions of operation of the machine required that they should be used in the several well known ways for the support of the cutting tool, not shown, or for the support of the outer end of knee 4, to provide greater rigidity between the work and the tool or to assist in the alignment of the cutting tool. The overarms are also slidable to project from the rear of the machine when not required, to be out of the way of the work, cutter or operator, and may also be set in any intermediate position.

The overarms may be clamped rigidly with the column when in any of their positions of adjustment by the means of clamps generally denoted in Fig. 1 by the numerals 9 and 10. Clamps 9 and 10 are similar in construction and operation therefore only one will be described in detail. In Fig. 2 is shown a section of clamp 9. A clamp member 11 is fitted in a suitable bore 12 of column 1 to move upwardly under the influence of a spring 13 when released, or to be forced downwardly by the means of a stud 14 having a nut 15 threaded thereon and to which a wrench may be applied. When forced down as described the surfaces 16 and 17 respectively contact the overarms 7 and 8 to which the surfaces are fitted, and owing to the arrangement and form of the parts the overarms are thereby forced strongly downward and outward against the walls of the respective column bores to be rigidly clamped with the column.

When an overarm is to be manually shifted the clamps are released but the friction of the heavy overarm against the lower surface of the column bore is still considerable, especially in the larger sizes of machines and overarm, unless means are taken to overcome such resistance.

For this purpose I have provided rollers both at the front and rear of the column for each overarm, underneath the arm. The rollers are supported in roller units designated for the overarm 7 as 18 and 19 in Fig. 1. Similar roller units 20 and 21, Fig. 1, for the overarm 8 coincide with the drawing of units 18 and 19 in Fig. 1, one of such units 20 being more clearly shown in Figs. 2, 3, 4, 5. The construction is the same for each unit therefore only the unit 20 will be described in detail.

A roller 22 is supported from a pivot pin 23 by the means of anti-friction rollers 24, 25, 26, 27, 28 each having a peripheral bearing in the bore 22ª of roller 22, and on the outer diameter of pin 23. The several anti-friction rollers are spaced apart to prevent peripheral contact with one another by the means of end plates 29 and 30, each of the anti-friction rollers being provided with a pin as illustrated for the roller 26 by the pin 26ª, the pins being fitted closely in axial bores of the respective rollers, the rollers being rotatable thereon. The ends of the pins are provided with spaced shoulders to establish the spacing of the end plates 29 and 30 and with end portions of smaller diameter which pass through suitably spaced holes in the end plates and are then riveted over as shown at 31, Fig. 3. The outside diameter of roller 22 is formed to fit to the circular section of the overarm thus providing a large contact as shown at 32, Fig. 3. The pivot pin 23 is fixed in a carrier or plunger 33 slidably fitted in a suitable bore in the column. The carrier 33 together with roller 22 is forced upwardly toward the overarm by the means of a spring 35 housed in a suitable bore 36 in the carrier and thrusting in the one direction against the top of the carrier bore 36, and in the other direction against the bottom of the column bore 34. Spring 35 is strong enough to substantially overcome the weight of the overarm thereby partially or entirely overcoming the friction between the overarm and its bore. To entirely overcome such friction when overarm 8 is in its extreme forward position, spring 35 is required to be strong enough to overcome substantially the entire weight of the overarm 8, which then extends above the same amount to front and rear of the roller unit 20, thus concentrating practically the entire weight of the overarm in overcoming spring 35.

It may happen when the overarm is shoved to the extreme rear that no weight is being supported from spring 35, the weight being then concentrated over the roller unit 21. Thus each roller unit may at times support the entire overarm weight, or may support no weight.

Provision is therefore made for each roller unit that the springs, which may be constructed strong enough to overcome the entire weight of an overarm, do not, when conditions are such that there is no weight to be supported, thrust the overarm upwardly to create friction between the upper surface of the overarm and the column bore.

Such a result is prevented by the means of stops, one of which will now be described for the roller unit 20, the stops being similar for each unit. A conical bore 37 is provided in the carrier 33, into which projects the conical point 38 of a screw 39, adjustable in a threaded bore in the wall of column 1. The conical bore 37 is so positioned relative to the point 38 that as the screw is adjusted in the one or the other axial direction the carrier 33 and roller 22 is permitted a greater or less upward movement. Screw 39 is adjusted to permit roller 22 an upward movement sufficient to overcome the friction of overarm 8 against the bottom of the overarm bore, but to prevent further upward movement which would cause friction against the top of the overarm bore. A lock nut 40 serves to permanently position the screw when so adjusted.

The stop, consisting of the construction and parts just described also prevents the continued upward movement of the unit 20 when the overarm 8 is for any reason removed from the column or moved beyond the unit. Such continued movement would be very objectionable as preventing convenient replacement of the overarm. This is likewise true of the similar stops associated with the other units.

It is to be understood that my invention herein illustrated and described in a preferred form, may in the light of this disclosure be embodied in a variety of equivalent forms, each within the spirit and scope of the following claims.

I claim:

1. In a machine tool the combination of an overarm, a structure providing a supporting surface underneath said overarm; and means tending to raise said overarm clear of said surface including a spring pressed pivoted roller.

2. In a machine tool the combination of an overarm, a structure providing a supporting surface for said overarm, means tending to force said overarm away from said surface and including a bodily movable pivoted roller and a spring bodily urging said roller toward the overarm, and a stop for limiting the bodily movement of said roller.

3. In a machine tool the combination of an overarm, a structure providing a supporting surface for said overarm and means tending to force said overarm away from said surface including a plurality of bodily movable pivoted rollers each having associated therewith spring means bodily urging the roller toward said overarm.

4. In a machine tool the combination of an overarm, a structure providing a supporting surface for said overarm and means tending to force said overarm away from said surface including a plurality of pivoted rollers independently supported from said structure for bodily movement at points substantially separated along the path of overarm adjustment, each of said rollers having associated therewith a spring urging the roller toward the overarm.

5. In a machine tool the combination of an overarm, a structure providing a supporting surface for said overarm, means tending to force said overarm away from said surface including a plurality of bodily movable pivoted rollers each having associated therewith a spring bodily urging the roller toward the overarm, and a stop for each roller for limiting the movement of the roller toward the overarm.

6. In a machine tool the combination of a column providing a bore, an overarm adjustably supported in said bore, and means tending to urge said overarm away from the lower wall of said bore including a bodily movable pivoted roller supported in peripheral contact with the underside of the overarm, and a spring urging said roller upwardly together with said overarm.

7. In a machine tool the combination of an overarm, a structure adjustably supporting said overarm, a clamp adapted to force said overarm against a surface of said structure, and means tending to shift said overarm clear of said surface when said clamp is released including a pivoted roller supported for bodily movement toward and from said overarm and a spring urging said roller toward said overarm.

8. The combination with a machine tool support of a plurality of overarms adjustably supported therefrom, a plurality of pivoted bodily movable rollers respectively contacting the underside of the respective overarms, and spring means urging each of said rollers bodily upward.

9. The combination with a machine tool support, of a plurality of overarms adjustably supported therefrom, a plurality of pivoted bodily movable rollers respectively contacting the under side of the respective overarms, spring means urging each of said rollers in a direction to move the overarm upwardly, and a stop for limiting the bodily movement of each of said rollers.

10. The combination with a machine tool support of a plurality of overarms adjustably supported therefrom, a plurality of bodily movable pivoted rollers for each of said overarms each contacting the under side of the overarm at points substanially separated along the path of overarm adjustment and spring means urging each of said rollers upwardly 11. The combination with a machine tool support of a plurality of overarms adjustably supported therefrom, a plurality of pivoted rollers for each of said overarms each contacting the under side of the overarm at points substantially separated along the path of overarm adjustment, spring means urging each of said rollers in a direction to move the overarm bodily upward and a stop for limiting the bodily movement of each of said rollers.

In witness whereof I hereto affix my signature.

GEORGE E. GUSTAFSON.